(12) United States Patent
Levy et al.

(10) Patent No.: US 10,621,202 B2
(45) Date of Patent: Apr. 14, 2020

(54) METHOD, APPARATUS AND DATA STRUCTURE FOR COPYING VALUES OF A TABLE OF A DATABASE

(71) Applicant: Huawei Technologies Co., Ltd., Shenzhen (CN)

(72) Inventors: Eliezer Levy, Munich (DE); Zhibiao Chen, Shenzhen (CN); Usama Dar, Shenzhen (CN); Aharon Avitzur, Munich (DE); Shay Goikhman, Munich (DE); Antoni Wolski, Helsinki (FI)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 266 days.

(21) Appl. No.: 15/656,404

(22) Filed: Jul. 21, 2017

(65) Prior Publication Data
US 2017/0322997 A1    Nov. 9, 2017

Related U.S. Application Data

(63) Continuation of application No. PCT/CN2015/095840, filed on Nov. 27, 2015.

(30) Foreign Application Priority Data

Apr. 7, 2015 (EP) ..................... 15162563

(51) Int. Cl.
*G06F 16/27*     (2019.01)
*G06F 16/22*     (2019.01)
(Continued)

(52) U.S. Cl.
CPC ........ *G06F 16/278* (2019.01); *G06F 11/1407* (2013.01); *G06F 11/1451* (2013.01);
(Continued)

(58) Field of Classification Search
CPC .. G06F 9/4843; G06F 11/3636; G06F 11/366; G06F 11/1438; G06F 11/1469;
(Continued)

(56) References Cited

U.S. PATENT DOCUMENTS 657,039 A     8/1900   Roswell et al.
838,092 A    12/1906   Ely et al.
(Continued)

FOREIGN PATENT DOCUMENTS

| CN | 1299096 A | 6/2001 |
| CN | 1348135 A | 5/2002 |
| CN | 102696017 A | 9/2012 |

OTHER PUBLICATIONS

Abadi, D., et al., "Column-Stores vs Row-Stores: How Different Are They Really?," SIGMOD, Jun. 9-12, 2008, 14 pages.
(Continued)

*Primary Examiner* — Angelica Ruiz
(74) *Attorney, Agent, or Firm* — Conley Rose, P.C.

(57) ABSTRACT

A method for copying values of a table of a database between a primary memory and a secondary memory comprises selecting one or more segments, wherein the table is organized in a plurality of stripes and a plurality of vertical partitions, wherein a stripe comprises at least two rows of the table, wherein a vertical partition comprises one or more columns of the table, wherein each of the plurality of segments comprises values at a cross-section of a stripe and a vertical partition, and wherein each of the plurality of segments stores adjacent column values in adjacent locations of the primary or the secondary memory, and copying the one or more selected segments between the primary memory and the secondary memory.

20 Claims, 8 Drawing Sheets

(51) Int. Cl.
*G06F 16/23* (2019.01)
*G06F 16/28* (2019.01)
*G06F 16/2455* (2019.01)
*G06F 11/14* (2006.01)
*G06F 12/122* (2016.01)
*G06F 12/128* (2016.01)

(52) U.S. Cl.
CPC .......... *G06F 12/122* (2013.01); *G06F 12/128* (2013.01); *G06F 16/2282* (2019.01); *G06F 16/2343* (2019.01); *G06F 16/2372* (2019.01); *G06F 16/24552* (2019.01); *G06F 16/28* (2019.01); *G06F 2201/80* (2013.01); *G06F 2201/84* (2013.01); *G06F 2212/621* (2013.01)

(58) Field of Classification Search
CPC .... G06F 9/342; G06F 9/3009; G06F 9/30134; G06F 9/3826; G06F 9/3838; G06F 9/384; G06F 12/0888; G06F 11/3476
See application file for complete search history.

(56) References Cited

U.S. PATENT DOCUMENTS

| | | | | |
|---|---|---|---|---|
| 6,453,383 | B1* | 9/2002 | Stoddard | G06F 3/0607 707/999.202 |
| 7,080,101 | B1 | 7/2006 | Watson et al. | |
| 8,448,021 | B1 | 5/2013 | Bonwick | |
| 8,990,335 | B2* | 3/2015 | Fauser | G06F 16/183 709/215 |
| 2011/0208996 | A1 | 8/2011 | Hafner et al. | |
| 2012/0197868 | A1* | 8/2012 | Fauser | G06F 16/183 707/714 |
| 2013/0117247 | A1 | 5/2013 | Schreter et al. | |
| 2013/0226959 | A1* | 8/2013 | Dittrich | G06F 16/2453 707/769 |
| 2015/0095697 | A1* | 4/2015 | Bonwick | G06F 11/1076 714/6.24 |
| 2016/0080833 | A1* | 3/2016 | Denoual | H04N 21/234327 725/116 |

OTHER PUBLICATIONS

Ailamaki, A., et al., "Data Page Layouts for Relational Databases on Deep Memory Hierarchies," The VLDB Journal 11(3), 2002, 32 pages.
"Anti-Caching: A New Approach to Database Management System Architecture," Proceedings of the VLDB Endowment, vol. 6, No. 14, Aug. 26-31, 2013, 12 pages.
Garcia-Molina, H., et al., "Main Memory Database Systems: An Overview," IEEE Transactions on Knowledge and Data Engineering, vol. 4, No. 6, Dec. 1992, pp. 509-516.
Hoppner, B., et al., "An Approach for Hybrid-Memory Scaling Columnar In-Memory Databases," XP55222075, Proceedings of the VLDB Endowment, vol. 7, No. 14, 2014, 10 pages.
Boissier, M., et al., "Optimizing Main Memory Utilization of Columnar In-Memory Databases Using Data Eviction," Proceedings of the VLDB, 2014, 6 pages.
Debrabant, J., et al., "Anti-Caching: A New Approach to Databases Management System Architecture," XP055222584, Proceedings of the VLDB Endowment, vol. 6, No. 14, Aug. 26-31, 2013, pp. 1942-1953.
Foreign Communication From a Counterpart Application, European Application No. 15162563.9, Extended European Search Report dated Oct. 27, 2015, 8 pages.
Foreign Communication From a Counterpart Application, PCT Application No. PCT/CN2015/095840, International Search Report dated Mar. 1, 2016, 4 pages.
Foreign Communication From A Counterpart Application, Chinese Application No. 201580077836.4, Chinese Office Action dated May 23, 2019, 6 pages.
Foreign Communication From A Counterpart Application, Chinese Application No. 201580077836.4, Chinese Search Report dated May 15, 2019, 2 pages.

* cited by examiner

METHOD, APPARATUS AND DATA STRUCTURE FOR COPYING VALUES OF A TABLE OF A DATABASE

CROSS-REFERENCE TO RELATED APPLICATIONS

This application is a continuation of International Application No. PCT/CN2015/095840, filed on Nov. 27, 2015, which claims priority to European Patent Application 15162563.9, filed on Apr. 7, 2015. The disclosures of the aforementioned applications are hereby incorporated by reference in their entireties.

TECHNICAL FIELD

The present disclosure relates to a method and an apparatus for copying values of a table of a database. The present disclosure also relates to a computer-readable storage medium and a data structure.

BACKGROUND

The traditional database storage layout of disk-based databases involves fixed-sized data pages composed of table rows. The data pages are fetched from disk and maintained in a shared page buffer pool, for efficient usage by concurrent applications. The page size and structure is optimized for efficient disk input/output (I/O). The solution is not suitable for in-memory databases because the overhead of the shared page buffer pool is too large. Especially, several steps of indirect addressing are applied to access a single data item (e.g. a column value). Additionally, in in-memory databases, there is no need to buffer the data on the way from, or to disk. The solution is also called a row store, or a row-oriented database because of the row orientation of the page structure. Row store is beneficial in on-line transaction processing (OLTP) databases. This is because the number of columns is small, and several column values are likely to be processed in a database operation like insert or select. On the other hand, in a column store, or a columnar database, the data is organized by placing the column values close to each other. Columnar databases are suited for analytical processing, because the number of columns can be very large (even in the range of hundreds or thousands) and most query operations are column-wise. By placing the column values adjacently, the efficiency of disk I/O and memory access is improved. Especially, in modern hardware platforms characterized by asymmetric memory (exemplified by the Non-Uniform Memory Access (NUMA) architecture), multi-level memory caches and vector processing (single instruction multiple data (SIMD)) units, the advantage of processing the memory contents sequentially is significant. Thus, all current implementations of in-memory analytics databases employ large column objects allocated in memory. The disadvantage of that solution is that it does not allow for data migration between the memory and disk. The data migration is required because there is a need to free memory from the data that has not been used recently, and restore it when it is needed. In columnar databases, there is also a need to move cold (not used recently) columns from memory to disk.

Most in-memory databases are not designed for data migration. Typically, an in-memory table has to reside in memory in its totality. That also applies to columnar databases where column data is stored in fixed-size column vectors. One prior art solution, called anti-caching, applies moving of the data to disk on a row-by-row basis. That is not suitable to columnar databases when a need to migrate data on a column basis emerges.

Regarding the data organization in memory, various solutions are proposed, tending to balance the needs of the row-oriented and column oriented processing. However, no solution has been offered to the problem of efficient copying of values, in particular data migration.

SUMMARY OF THE DISCLOSURE

In view of the above, one object of the present disclosure is to provide a method, an apparatus, a computer-readable storage medium and a data structure that solve at least one of the above-mentioned problems of the prior art. The foregoing and other objects are achieved by the features of the independent claims. Further implementation forms are apparent from the dependent claims, the description and the Figures.

A first aspect of the disclosure provides a method for copying values of a table of a database between a primary memory and a secondary memory, wherein the table is organized in a plurality of stripes and a plurality of vertical partitions, wherein a stripe comprises at least two rows of the table and a vertical partition comprises one or more columns of the table, wherein the table is stored as a plurality of segments, wherein a segment comprises values at a cross-section of a stripe and a vertical partition, and wherein a segment stores adjacent column values in adjacent locations of the primary or the secondary memory, the method comprising a step of selecting one or more segments and copying the one or more selected segments between the primary memory and the secondary memory.

In the following copying also comprises evicting, i.e., copying the data from source memory to destination memory and deleting the data from the source memory.

The data of the table of database is organized and/or copied in segments. Segments can be units of database checkpointing and data migration. The segments can adhere to the principles of a columnar database in that they can contain sequences of column values of one or more columns of a table.

The organization of the values of the table in segments, which each store adjacent column values in adjacent memory locations, allows for efficient parallel column-wise processing of data in memory, while still being able to evict or restore data from memory efficiently. In embodiments of the disclosure, a consistent persistent image of the database can be maintained, and "cold" data can be kept on disk.

A segment contains values at a cross-section of a set of rows and one or more columns of a table. It contains one or more column value vectors and is thus suitable for column-wise computing. In a segment, column values are organized in adjacent memory locations, suitable for efficient scanning and vector processing (SIMD). Column values are aligned, in segments, in such a way that a set of horizontal segments, called a stripe, represents a set of rows. Preferably, a segment can be stored on the secondary memory in binary form, without a need of reformatting. Upon restore of a segment, the column vectors can be available at pre-defined offsets of the segment memory block. In other words, in embodiments of the disclosure, a segment is a data unit that is shared between the checkpoint activity and data migration activity.

In an embodiment of the disclosure, a segment comprises values of a cross-section of a connected set of rows and a connected set of one or more columns of a table of the database, but comprises no values from at least one column of the table. In other words, segments can comprise values of a rectangular region of the table of the database. In particular, it can be foreseen that a segment only consists of the values of a rectangular region of the table of the database. In other embodiments, the segment might consist of the values of the rectangular region of the table of the database and some additional metadata, but no values from cells in the table that are outside the mentioned rectangular region.

In the following, values of a table can refer to any kind of data that can be stored in a table, in particular any kind of data that can be stored in a cell of a table. Among others, a value can be an integer value, a floating point value, or any more complex variable or data structure.

According to a first possible implementation of the method according to the first aspect, the method is implemented in a database management system and/or the primary memory is a volatile memory and the secondary memory is a persistent memory, in particular a hard disk. Implementing the method in a database management system has the advantage that the database management system can efficiently copy values of a table of the database between primary and secondary memory. If the secondary memory is a persistent memory, the method provides an efficient way of backing up data to a persistent storage.

According to a second possible implementation of the method according to the first aspect, the method is a checkpointing method for copying one or more changed segments from the primary memory of the database to the secondary memory. Storing some segments in a volatile memory and other segments in a persistent memory can be advantageous (e.g. if the volatile memory has a faster access time than the persistent memory).

In embodiments of the disclosure, changed segments, i.e., segments that have changed in the memory, are checkpointed (copied) to disk at checkpoint intervals. The checkpoint intervals can be regular intervals determined by a clock unit, or they can be irregular intervals that are determined based on a rule, e.g. based on when a sufficient number of changes that need checkpointing has accumulated.

According to a third possible implementation of the method according to the first aspect, the method of the first aspect comprises selecting one or more segments in the primary memory that have changed, freezing the one or more selected segments, such that a state of the one or more selected segments is preserved, copying them one or more frozen segments to the secondary memory, and releasing the frozen segments.

Freezing the one or more selected segments can be implemented e.g. by preventing write access to the segment. This allows that a consistent state of the one or more selected segments is copied to the secondary memory. Preferably, after copying, the frozen segments are released in the primary memory.

According to a fourth possible implementation of the method according to the first aspect, freezing the one or more selected segments comprises shadowing, copying on write, or locking of the one or more selected segments. With a copy-on-write freezing method, the frozen segments are "forgotten" (i.e. removed from memory) and replaced with changed copies. As should be appreciated, freezing the selected segments can also be performed with further freezing methods.

Releasing the frozen segments finalizes the checkpointing operation and makes the selected segments available for new changes.

According to a fifth possible implementation, the method of the first aspect is a method for evicting data from the primary memory to the secondary memory.

According to a sixth possible implementation of the method according to the first aspect, the method comprises detecting a need for data eviction, determining an extent of the needed data eviction, selecting one or more segments to be evicted, for each selected segment, determining whether the segment has been checkpointed, for each selected segment that has not been checkpointed, copying the segment from the primary memory to the secondary memory, and deleting the selected segments from the primary memory.

This implementation provides an efficient way of segment eviction. A special case of a segment eviction is an eviction of a full column, wherein the full column can be evicted by evicting a plurality of segments that make up the full column. For example, if the table of the database is organized into four stripes, a full column can be evicted by evicting the corresponding four segments.

The method according to the fifth possible implementation can further comprise a step of, for each identified segment that has been checkpointed, marking the segment as evicted.

When an eviction request is issued, for example the one or more least recently used segments can be moved to disk. Because segments that are resident on the secondary memory are shared between the checkpoint and data migration, the method can include an optimization such that, upon eviction, the one or more segments need not be written to disk if they have been already checkpointed before. In that case, the one or more segments are only removed from primary memory and marked as evicted. Most of the segments being evicted satisfy the condition because, in most cases, the evicted segments have not been recently used (e.g. changed).

According to a seventh possible implementation, in the method of the sixth implementation the step of selecting the segments to be evicted comprises selecting least recently used segments, selecting one or more full columns that are not likely to be used, and/or selecting a segment based on a selection criterion that is based on an age of the data.

Thanks to the grid-like layout of the segments, various collections of segments can be selected for eviction. Possible choices of the selecting method also include selecting spans of rows, with segment granularity, based on some criterion like the age of data. On segment restore, demand paging can be used whereby the segments are actually loaded to memory when they are needed.

According to an eighth possible implementation, the one or more selected segments are encrypted and/or compressed before they are copied to the secondary memory. Encrypting the one or more selected segments has the advantage that unauthorized access to the data of the database is prevented. For example, if an intruder achieves unauthorized access to the secondary memory, he could not retrieve the information content of the database table if the segments are encrypted before copying to the secondary memory.

According to a ninth possible implementation, the copying is performed as part of restoring data from the secondary memory back to the primary memory.

According to a tenth possible implementation, the method according to the first aspect further comprises detecting a need for restoring of data, determining which data need restoring, selecting one or more segments to be restored, determining whether the primary memory comprises sufficient free space for restoring the selected segments, if there is not sufficient free space, freeing space in the primary memory by evicting data, in particular one or more segments, from the primary memory, restoring the selected segments from the secondary memory back to the primary memory.

According to an eleventh possible implementation, the one or more selected segments are decrypted and/or decompressed before they are restored from the secondary memory back to the primary memory. Preferably, the decryption or decompression is performed "on the fly," such that e.g. a database management system is not even aware that segments of its database were temporarily encrypted and/or compressed.

If the segments are stored on the secondary memory in an encrypted or compressed form, adjacent column values are stored in adjacent memory locations only in the sense that their decrypted or decompressed version corresponds to storing adjacent column values in adjacent (uncompressed/unencrypted) memory locations.

A second aspect of the present disclosure provides apparatus for copying values of a table of a database between a primary memory and a secondary memory, wherein the table is organized in stripes and vertical partitions and a stripe comprises at least two rows of the table and a vertical partition comprises one or more columns of the table, wherein the table is stored as a plurality of segments, wherein a segment comprises values at a cross-section of a stripe and a vertical partition, and wherein a segment stores adjacent column values in adjacent locations of the primary memory, wherein the apparatus is configured to select one or more segments and copy the one or more selected segments between the primary memory and the secondary memory.

In particular the second aspect of the disclosure provides an apparatus that is configured to carry out the method of the first aspect of the disclosure and/or one or more of the implementations of the first aspect of the disclosure.

A third aspect of the disclosure provides a computer-readable storage medium, comprising program code, the program code comprising instructions for carrying out the method of the first aspect of the disclosure and/or one or more of the implementations of the first aspect of the disclosure.

A fourth aspect of the disclosure provides a data structure of a database, comprising a plurality of segments of a table of the database, wherein the table is organized in stripes and vertical partitions and a stripe comprises at least two rows of the table and a vertical partition comprises one or more columns of the table, wherein the table is stored in the data structure as a plurality of segments, wherein a segment comprises values at a cross-section of a stripe and a vertical partition, and wherein a segment stores adjacent column values in adjacent locations of a primary memory.

BRIEF DESCRIPTION OF THE DRAWINGS

To illustrate the technical features of embodiments of the present disclosure more clearly, the accompanying drawings provided for describing the embodiments are introduced briefly in the following. The accompanying drawings in the following description are merely some embodiments of the present disclosure, but modifications on these embodiments are possible without departing from the scope of the present disclosure as defined in the claims.

DETAILED DESCRIPTION OF THE EMBODIMENTS

Figure 1:
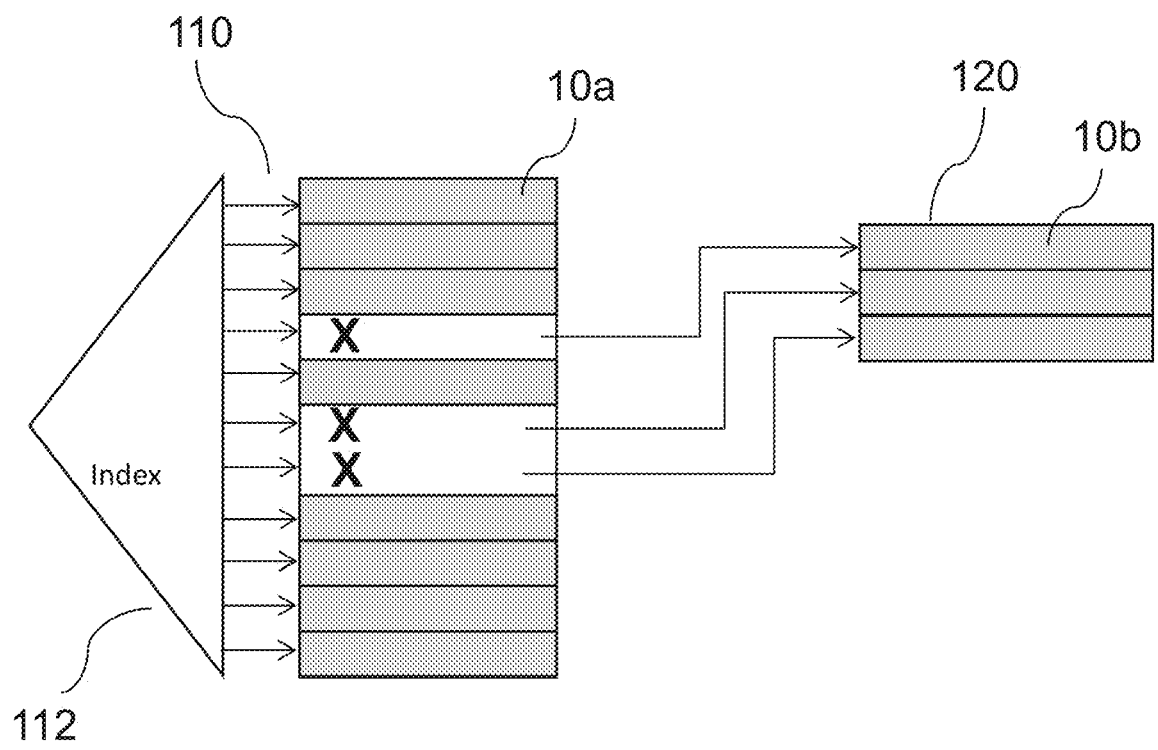
FIG. 1 shows a high level diagram of a system for copying values of a table of a database that is not in accordance with the present disclosure.

FIG. 1 is a high level diagram of a system for copying data that is not part of the present disclosure. The system 100 shown in FIG. 1 comprises a primary memory 110 and a secondary memory 120. The primary memory 110 is organized in a plurality of rows 10a that are indexed by an index 112. On the secondary memory 120, rows 10b are stored that were evicted from the primary memory 110. On a row miss, i.e., when access is required to a row that is missing in primary memory 110, the corresponding evicted row 10b is restored to primary memory 110. No column-wise eviction and restore is possible.

Figure 2:
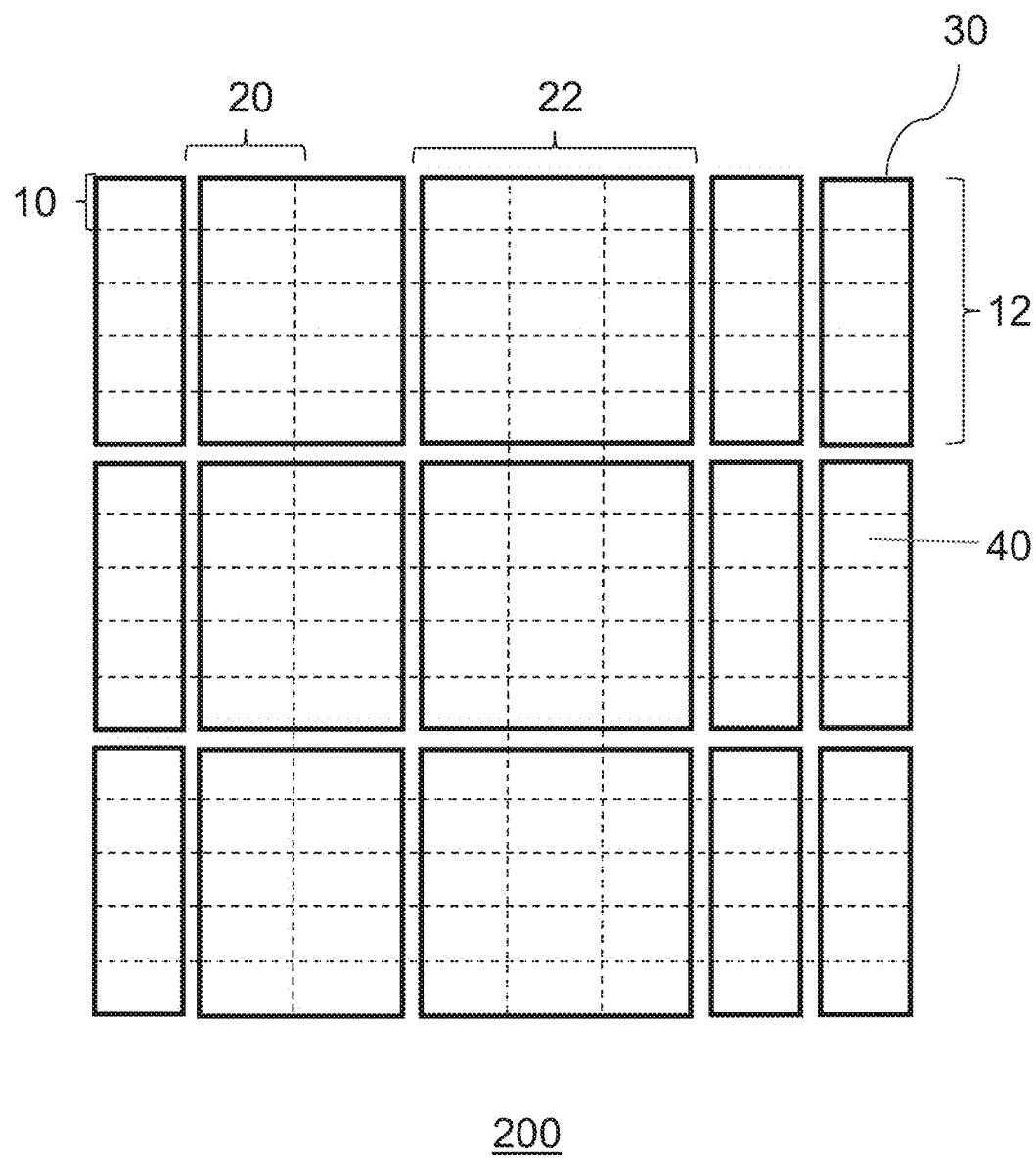
FIG. 2 shows a schematic illustration of a table that is organized according to embodiments of the disclosure.

FIG. 2 shows a schematic representation of a table 200 that is organized according to embodiments of the disclosure. This schematic representation also indicates the layout of a data structure according to an aspect of the present disclosure. The table 200 comprises rows 10 and columns 20. The table 200 is organized in stripes 12 that comprise a plurality of rows 10. In the example shown in FIG. 2 the first, second and third stripe 12 each comprises five rows. The table 200 is furthermore organized in vertical partitions 22 that comprise one or more columns 20. In the example shown in FIG. 2, the first vertical partition comprises one column, the second vertical partition comprises two columns, the third vertical partition 22 comprises three columns and the fourth and fifth vertical partition each comprise one column. Each cell of the table stores one column value 40.

In embodiments of the disclosure, the organization of the table is reflected in the physical storage of the table such that the segments of the table are stored subsequently on a physical storage. Furthermore, the segments are units of database checkpointing and data migration. The segments adhere to the principles of a columnar database in that they contain sequences of column values of one or more columns of the table.

Figure 3:
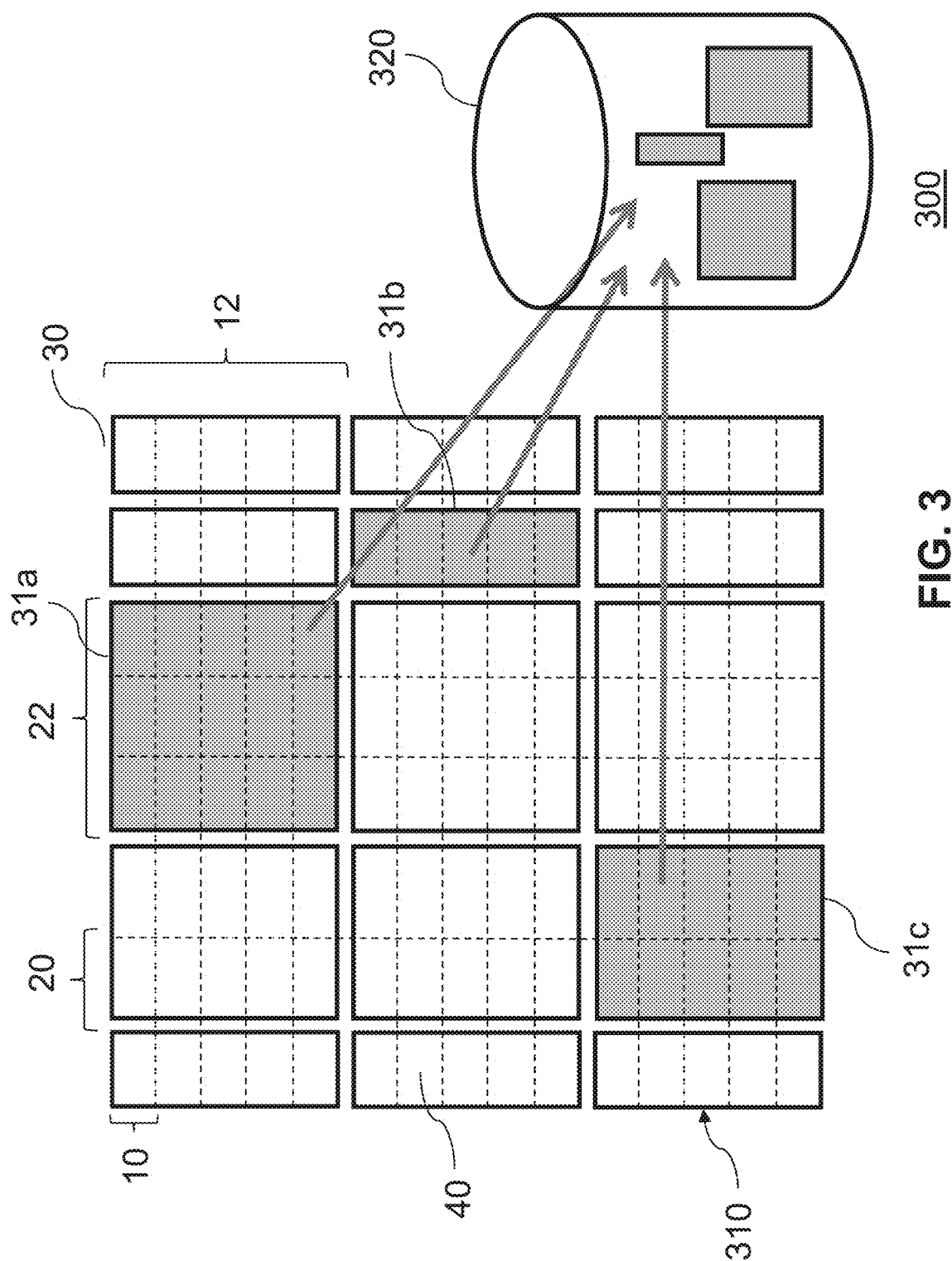
FIG. 3 shows a schematic illustration of a table of a database and a method for checkpointing values of the table in an embodiment of the disclosure that is related to checkpointing.

FIG. 3 illustrates an apparatus and a method for checkpointing data of an in-memory database in accordance with the present disclosure. A database checkpoint is a persistent storage representing a consistent state of a database. Database checkpoints are used e.g. upon recovery from computer system failures. The operation of creating a checkpoint is called checkpointing. In an embodiment, one way to do checkpointing is to store only the data that has changed since the previous checkpointing. This is called incremental checkpointing. An execution of an incremental checkpointing using the disclosure method is illustrated in FIG. 3.

The system 300 shown in FIG. 3 comprises a table 310 that comprises rows 10 and columns 20 and that is organized in stripes 12 and vertical partitions 22. The plurality of stripes 12 and vertical partitions 22 define segments 30, wherein each segment 30 comprises the column values 40 that are contained in a cross section of a stripe 12 and a vertical partition 22.

Whenever a change to a segment is detected, the one or more changed segments 31a, 31b, 31c are copied to the secondary memory 320. In that way, the secondary memory 320 functions as a checkpoint storage for changed segments. On a subsequent segment restore, demand paging can be used whereby segments are actually loaded to primary memory 310 when they are needed. For example, the primary memory 310 can be the working memory of a computing device which is hosting the database and a database management system managing the database.

Figure 4:
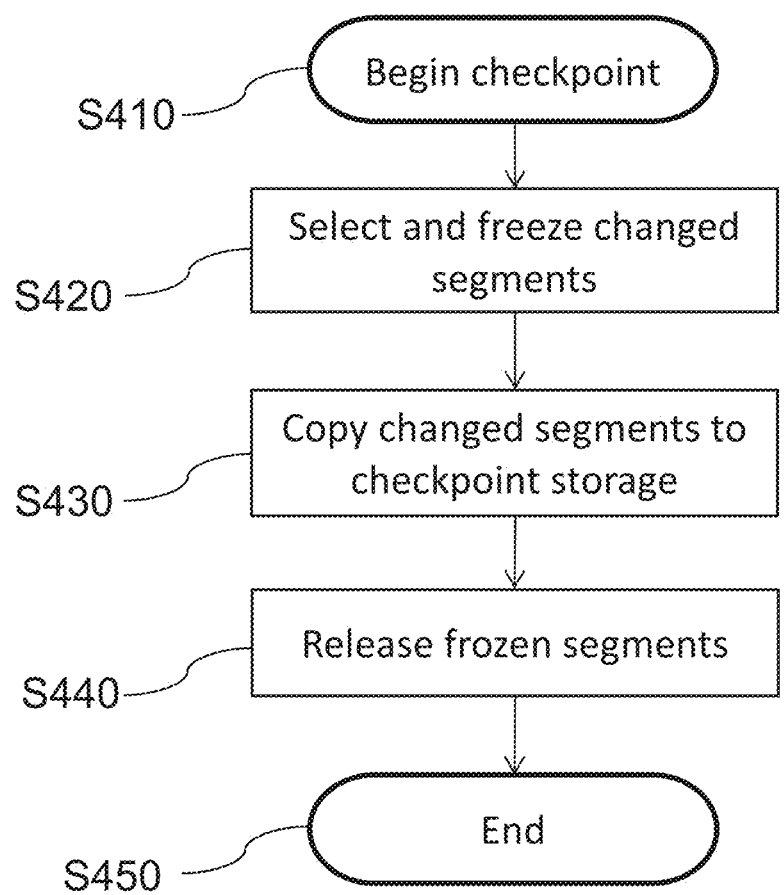
FIG. 4 shows a flow chart of a method for checkpointing a database according to an embodiment of the disclosure.

FIG. 4 shows a flow chart of a checkpointing method in accordance with the present disclosure. In a first step S410, a new checkpoint is begun (e.g. by starting the time interval corresponding to a new checkpoint). Then, in step S420, one or more changed segments are identified and freezed, i.e. a further modification of the changed segments is prevented. There are various methods to implement freezing, like shadowing, copy on write, or locking. With a copy-on-write freezing method, the frozen segments are "forgotten" (i.e. removed from memory) and replaced with changed copies.

In step S430, the changed segments are copied to a checkpoint storage, which can be a persistent storage. In step S440, the frozen segments are released, i.e. the frozen segments are made available for future modifications. In step S450, the method ends. In other embodiments, instead of the method ending in step S450, the method can be executed iteratively, i.e. a new checkpoint is begun.

A further embodiment of the present disclosure is related to an implementation of the operation of data migration from primary memory to persistent storage by way of segment eviction. A special case of a segment eviction is an eviction of a full column, as illustrated in FIG. 5.

Figure 5:
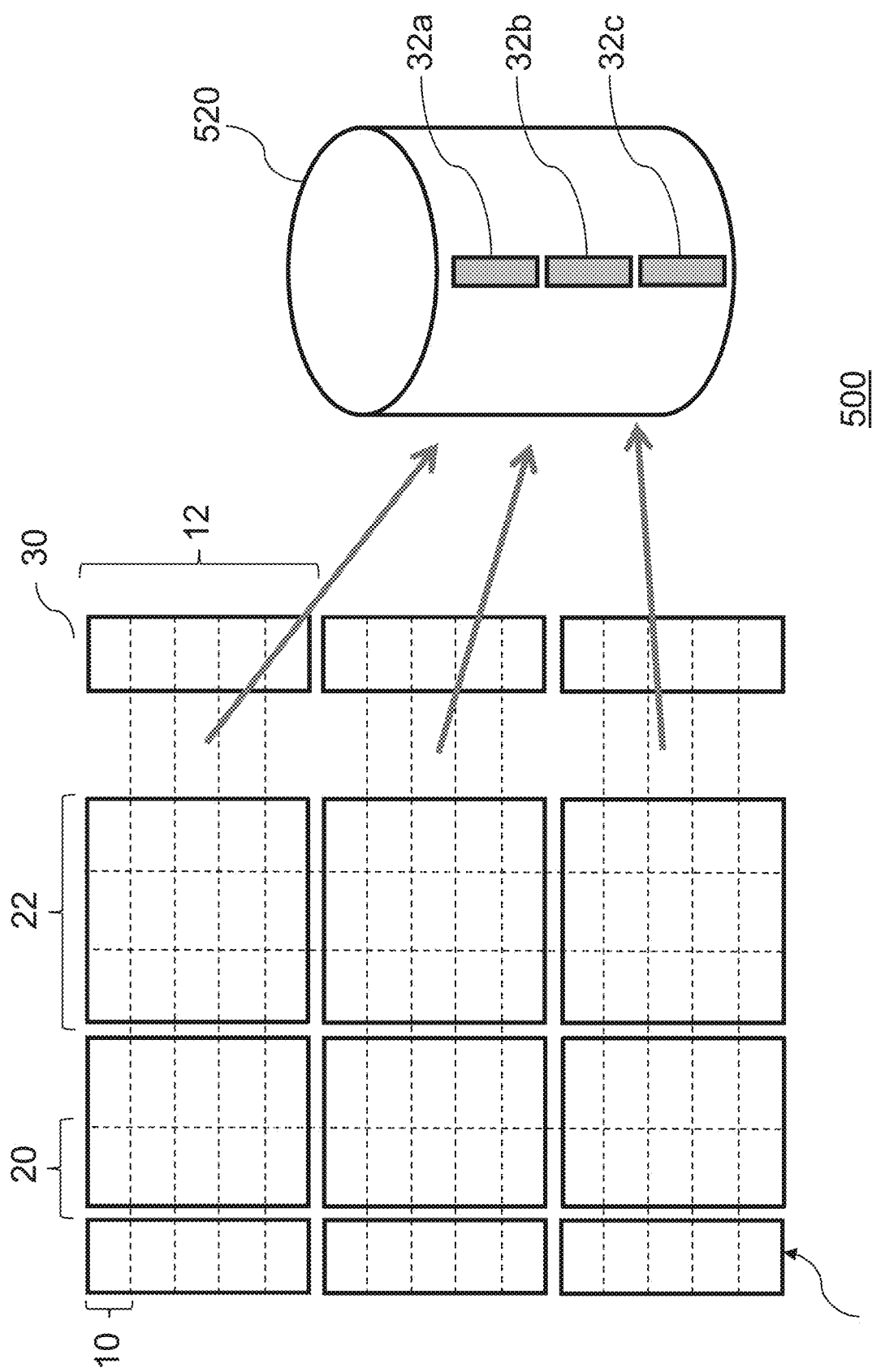
FIG. 5 shows a schematic illustration of a table of a database and a method for evicting segments of that table to a secondary memory in accordance with the present disclosure.

The system 500 shown in FIG. 5 comprises a table 510 of an in-memory database that is primarily stored in a primary memory. Furthermore, the system 500 comprises a secondary memory 520 that acts as a segment storage for one or more segments 32a, 32b, 32c that are evicted from the primary memory.

Figure 6:
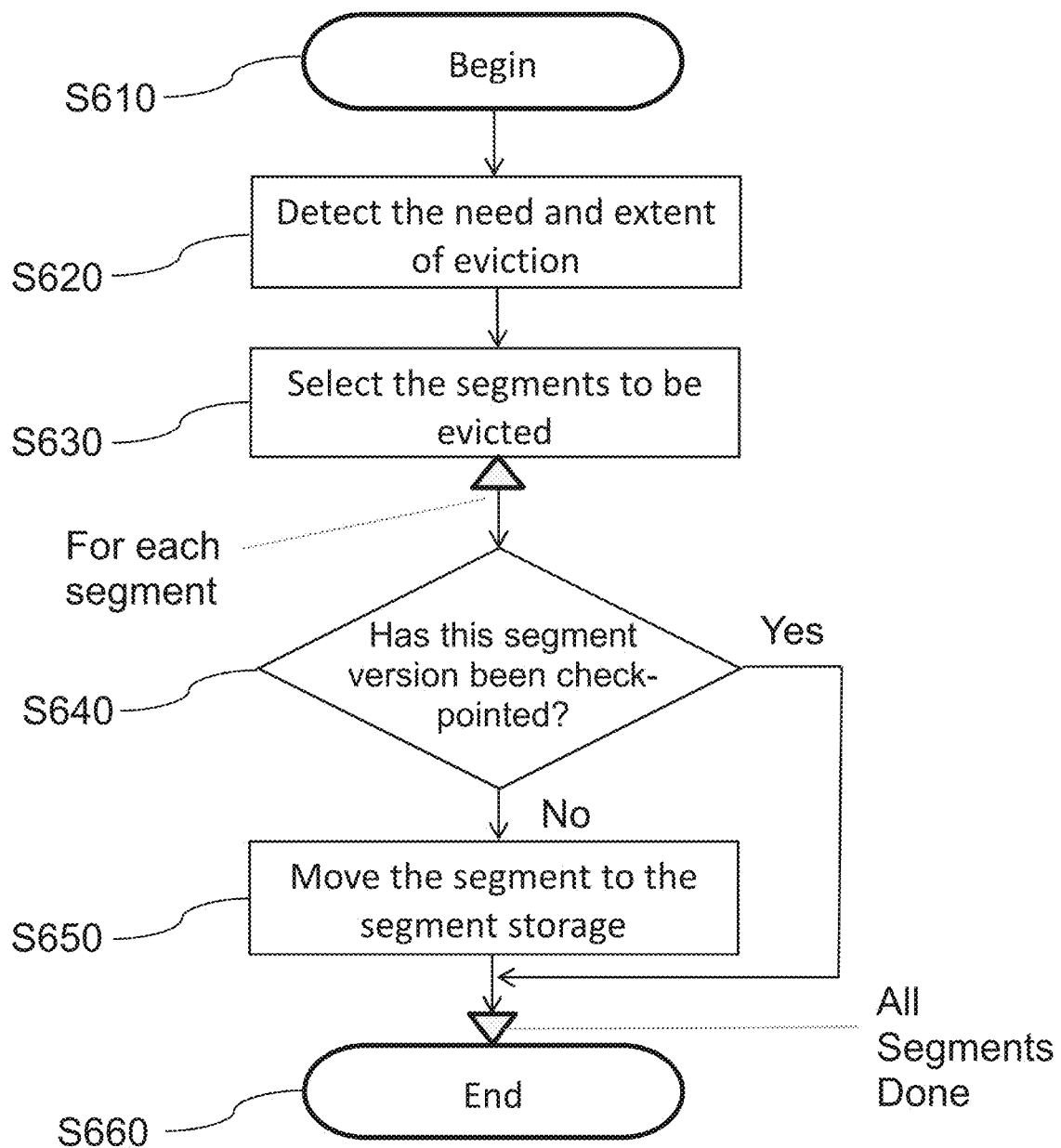
FIG. 6 shows a flow chart of a method for evicting segments of a table according to an embodiment of the disclosure.

The steps of carrying out the segment eviction are illustrated in the flow chart in FIG. 6. When there is a need for data eviction (for example, when there is no room in the primary memory for new data), the eviction method is invoked. In step S610, the method is invoked. In step S620, a need for eviction is detected, and an extent (in terms of the amount of free space needed) is evaluated. In this step, a selection method can be chosen, for example by selecting full columns for eviction. In step S630, the segments to be evicted are selected. As a special case, the whole column can be indicated for eviction. Once the segments are identified, in step S640, for each evicted segment, a check is done whether that segment has been checkpointed in its current state. If so, no storing to persistent storage is needed. The segment is removed from the primary memory. If the segment has not been checkpointed, in step S650 it is moved to the secondary memory, e.g. a persistent storage such as a hard disk. In step S660, the method ends. In other embodiments of the disclosure, the previous steps can be carried out iteratively, i.e., instead of ending the method in step S660, execution of the method is continued at step S620.

In embodiments of the disclosure, as indicated in FIG. 6, steps S640 and S650 are performed for each segment of the table.

Figure 7:
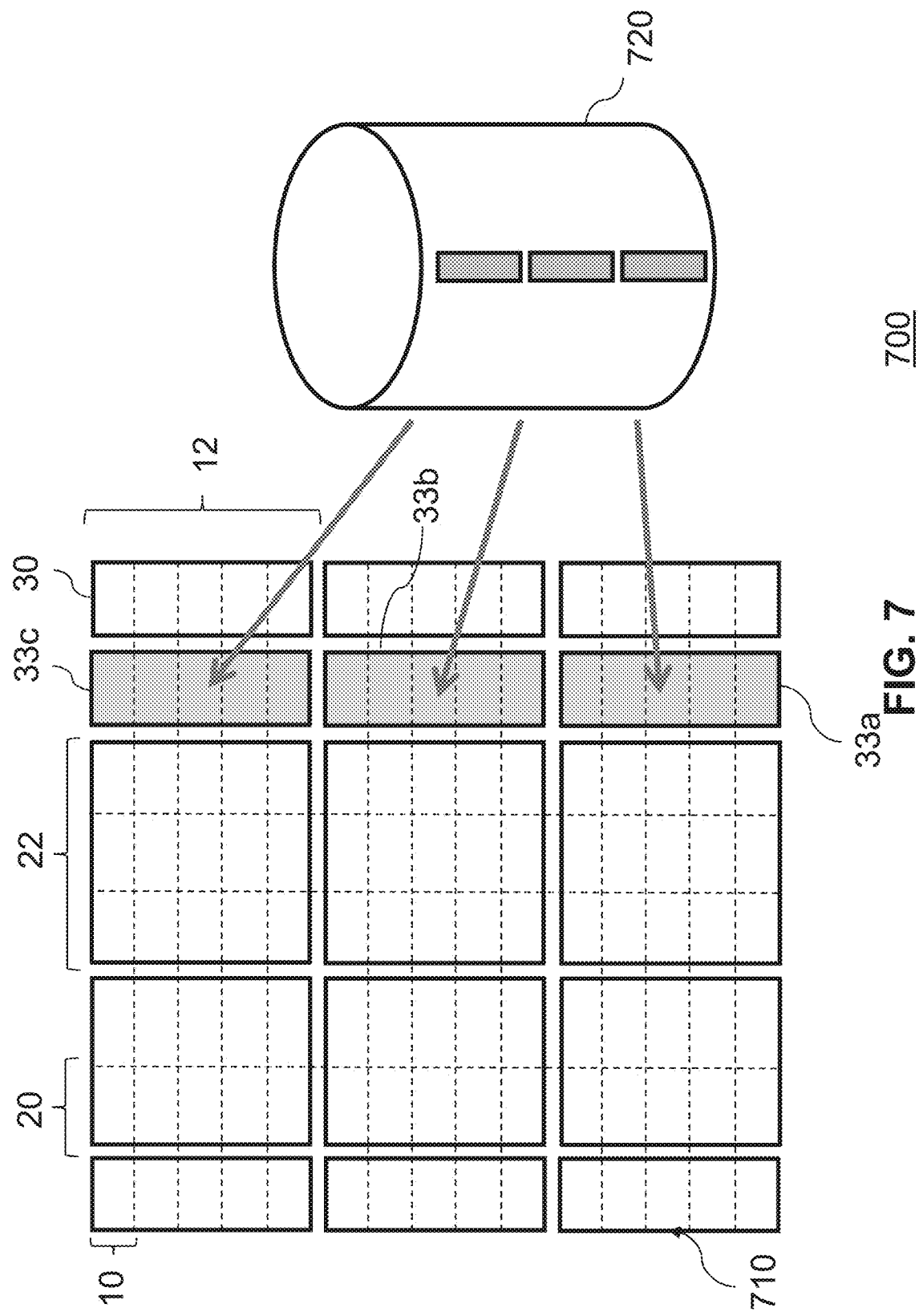
FIG. 7 shows a schematic illustration of a table of a database and a method for restoring segments from the secondary memory in accordance with the present disclosure.

A third embodiment of the disclosure is an implementation of an operation of segment restore, after the segments have been evicted before. The need for restore can result from a query that accesses the evicted data, for example an evicted column. FIG. 7 illustrates a system 700 where a plurality of segments 33a, 33b, 33c are restored from a segment storage 720 to a table 710 that is stored in a primary memory.

Figure 8:
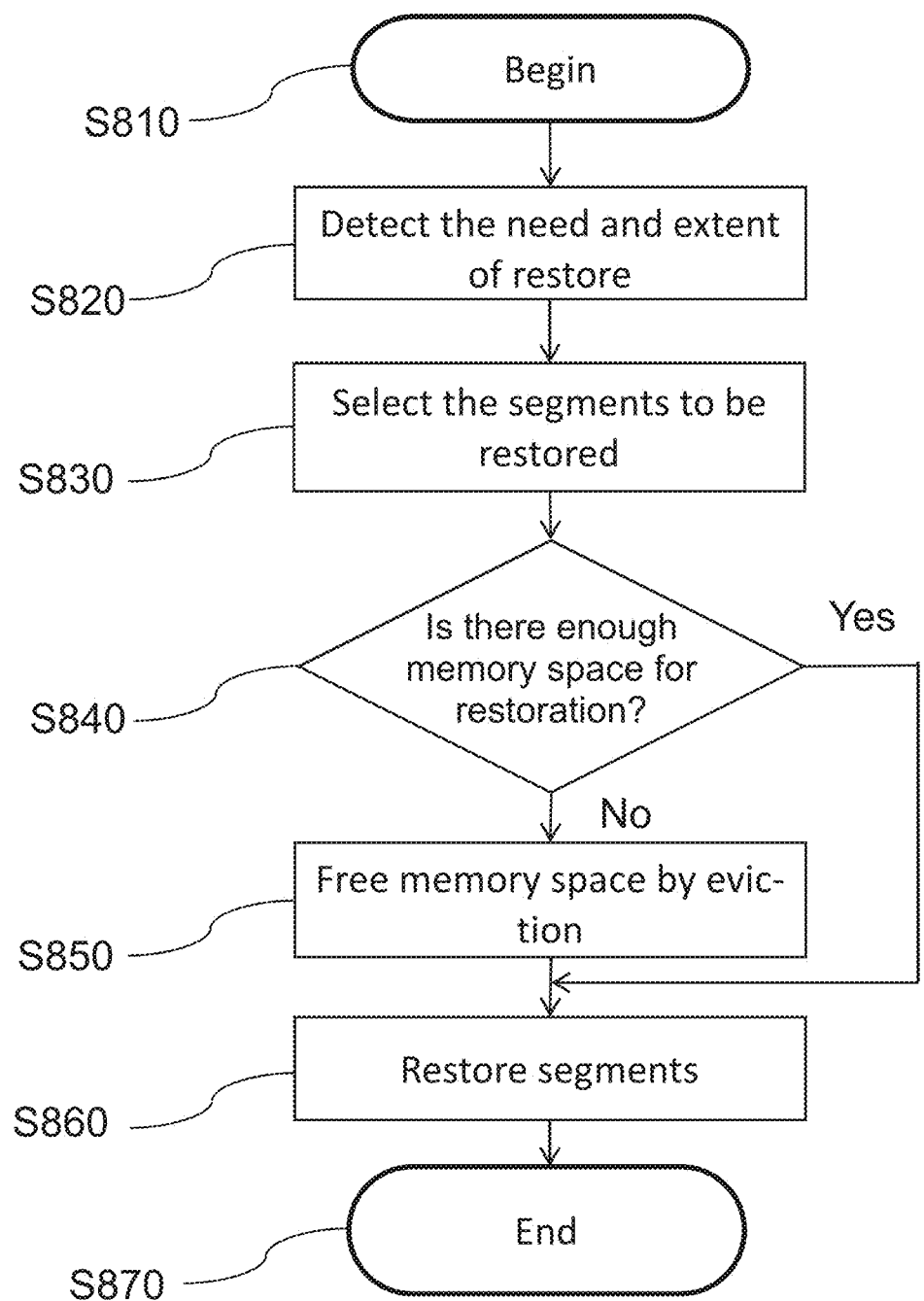
FIG. 8 shows a flow chart of a method for restoring segments of a table according to an embodiment of the disclosure.

The corresponding method steps are illustrated in the flow chart shown in FIG. 8. Execution of the method begins in step S810. The need for restore (e.g. caused by a query requesting the evicted data) is evaluated in step S820. The segments to be restored are identified in step S830. In step S840, a check is performed whether there is enough memory space for restoring the segments. If not, in step S850, the necessary memory space is freed by evicting segments from the primary memory. In step S860, the identified segments are restored from the secondary memory to the primary memory. In step S870, the method terminates.

The foregoing descriptions are only implementation manners of the present disclosure, but the protection of the scope of the present disclosure is not limited to this. Any variations or replacements can be easily made through the person skilled in the art. Therefore, the protection scope of the present disclosure should be subject to the protection scope of the attached claims.

What is claimed is:

1. A method for copying values of a table stored in a primary memory of a database, comprising:
   selecting a segment of the table comprising a plurality of stripes and a plurality of vertical partitions, wherein a stripe of the plurality of stripes comprises at least two rows of the table, wherein a vertical partition of the plurality of vertical partitions comprises one or more columns of the table, wherein the segment comprises values at a cross-section of the stripe and the vertical partition; and
   copying the segment from the primary memory to a secondary memory of the database.

2. The method of claim 1, further comprising detecting a change to the segment before selecting the segment.

3. The method of claim 1, further comprising:
   selecting the segment in the primary memory in response to detecting a change to the segment;
   freezing the segment such that a state of the segment is preserved;
   copying the segment to the secondary memory; and
   releasing the segment.

4. The method of claim 3, wherein freezing the segment comprises at least one of shadowing, copying on write, or locking of the segment.

5. The method of claim 1, further comprising:
   detecting that the primary memory is lacking available storage space;
   determining an amount of storage space needed in the primary memory;

selecting the segment to be evicted;
determining whether the segment has been checkpointed;
copying the segment from the primary memory to the secondary memory in response to the segment not having been checkpointed; and
deleting the segment from the primary memory.

6. The method of claim 5, wherein selecting the segment to be evicted comprises:
selecting one or more least recently used segments; and
selecting one or more full columns that are unlikely to be used, wherein the segment comprises is the one or more least recently used segments and comprises the one or more full columns that are unlikely to be used.

7. The method of claim 5, wherein selecting the segment to be evicted comprises:
selecting one or more least recently used segments; and
selecting one or more segments based on a selection criterion related to an age of the data, wherein the segment comprises at least one of one or more least recently used segments or the one or more segments selected based on the selection criterion.

8. An apparatus for copying values of a table stored at a primary memory of a database, comprising:
a memory comprising instructions; and
a processor configured to execute the instructions, which cause the processor to be configured to:
select a segment of the table comprising a plurality of stripes and a plurality of vertical partitions, wherein a stripe of the plurality of stripes comprises at least two rows of the table, wherein a vertical partition of the plurality of vertical partitions comprises one or more columns of the table, wherein the segment comprises values at a cross-section of the stripe and the vertical partition; and
copy the segment from the primary memory to a secondary memory of the database.

9. The apparatus of claim 8, wherein the instructions further cause the processor to detect a change to the segment before selecting the segment.

10. The apparatus of claim 8, wherein the instructions further cause the processor to be configured to:
select the segment in the primary memory in response to detecting a change to the segment;
freeze the segment such that a state of the segment is preserved;
copy the segment to the secondary memory; and
release the segment.

11. The apparatus of claim 10, wherein the instructions further cause the processor to be configured to freeze the segment by at least one of shadowing, copying on write, or locking of the segment.

12. The apparatus of claim 10, wherein the instructions further cause the processor to be configured to:
detect that the primary memory is lacking available storage space;
determine an amount of storage space needed in the primary memory;
select the segment to be evicted;
determine whether the segment has been checkpointed;
copy the segment from the primary memory to the secondary memory in response to the segment not having been checkpointed; and
delete the segment from the primary memory.

13. The apparatus of claim 10, wherein the instructions further cause the processor to be configured to:
select one or more least recently used segments; and
select one or more full columns that are unlikely to be used, wherein the segment comprises is the one or more least recently used segments and comprises the one or more full columns that are unlikely to be used.

14. A non-transitory computer-readable storage medium, comprising program code, which when executed by a processor, causes the processor to be configured to:
select a segment of a table comprising a plurality of stripes and a plurality of vertical partitions, wherein a stripe of the plurality of stripes comprises at least two rows of the table, wherein a vertical partition of the plurality of vertical partitions comprises one or more columns of the table, wherein the segment comprises values at a cross-section of the stripe and the vertical partition; and
copy the segment from the primary memory to a secondary memory of a database.

15. The non-transitory computer-readable storage medium of claim 14, wherein the program code, when executed by the processor, further causes the processor to be configured to detect a change to the segment before selecting the segment.

16. The non-transitory computer-readable storage medium of claim 14, wherein the program code, when executed by the processor, further causes the processor to be configured to:
select the segment in the primary memory in response to detecting a change to the segment; and
freeze the segment such that a state of the segment is preserved.

17. The non-transitory computer-readable storage medium of claim 16, wherein the program code, when executed by the processor, further causes the processor to be configured to:
copy the segment to the secondary memory; and
release the segment.

18. The non-transitory computer-readable storage medium of claim 14, wherein segment is frozen by performing at least one of shadowing, copying on write, or locking of the segment.

19. The non-transitory computer-readable storage medium of claim 14, wherein the program code, when executed by the processor, further causes the processor to be configured to:
detect that the primary memory is lacking available storage space;
determine an amount of storage space needed in the primary memory; and
select the segment to be evicted.

20. The non-transitory computer-readable storage medium of claim 19, wherein the program code, when executed by the processor, further causes the processor to be configured to:
determine whether the segment has been checkpointed;
copy the segment from the primary memory to the secondary memory in response to the segment not having been checkpointed; and
delete the segment from the primary memory.

* * * * *